United States Patent [19]
Cheeseman

[11] Patent Number: 5,357,299
[45] Date of Patent: Oct. 18, 1994

[54] CONVERSION ARRANGEMENT FOR OPTICAL UNITS FOR USE WITH CAMERAS

[75] Inventor: Alan R. Cheeseman, Binley, England

[73] Assignee: Van Diemen Films Limited, Leicester, England

[21] Appl. No.: 752,522

[22] PCT Filed: Mar. 2, 1990

[86] PCT No.: PCT/GB90/00330
§ 371 Date: Feb. 26, 1992
§ 102(e) Date: Feb. 26, 1992

[87] PCT Pub. No.: WO90/10250
PCT Pub. Date: Sep. 7, 1990

[30] Foreign Application Priority Data
Mar. 2, 1989 [GB] United Kingdom ............... 8904748

[51] Int. Cl.$^5$ .............................................. G03B 1/18
[52] U.S. Cl. ................................. 354/195.1; 354/286; 359/823; 359/830
[58] Field of Search ............... 354/79, 286, 295, 195.1, 354/195.12, 195.13; 359/819, 822, 823, 829, 830

[56] References Cited

U.S. PATENT DOCUMENTS

| | | | |
|---|---|---|---|
| 2,254,537 | 9/1941 | Nerwin | 354/273 |
| 2,529,894 | 11/1950 | Altman et al. | 359/823 X |
| 4,506,952 | 3/1985 | Grollimund | 359/823 |

FOREIGN PATENT DOCUMENTS
0333637 3/1989 .

Primary Examiner—Howard B. Blankenship
Attorney, Agent, or Firm—Longacre & White

[57] ABSTRACT

A conversion arrangement for mounting optical units on a camera such as a film or television camera has a generally cylindrical mounting body (12, 14) for attachment to the camera body, a generally cylindrical carrier (B) for attachment to the optical unit, the carrier being coaxially coupled to the mounting body for axial movement relative to the mounting body, and a focusing ring (22) which is coaxial with and coupled to both the mounting body (12, 14) and the carrier (B). The focusing ring is rotatable relative to the mounting body and carrier to move the carrier axially of the mounting body to focus the optical unit. Backlash during focusing is reduced to nil or negligible proportions by use of a gapped movement ring (34) which has a radially outer screw-thread engaging a cooperating screw-thread in a radially inner surface of the focusing ring. The movement ring (34) is secured against axial and rotational movement relative to the carrier (B) but is biased radially outwardly into positive engagement with the focusing ring. This avoids the need for very precise machining of the screw-threads on the focusing ring (22) and movement ring (34).

21 Claims, 1 Drawing Sheet

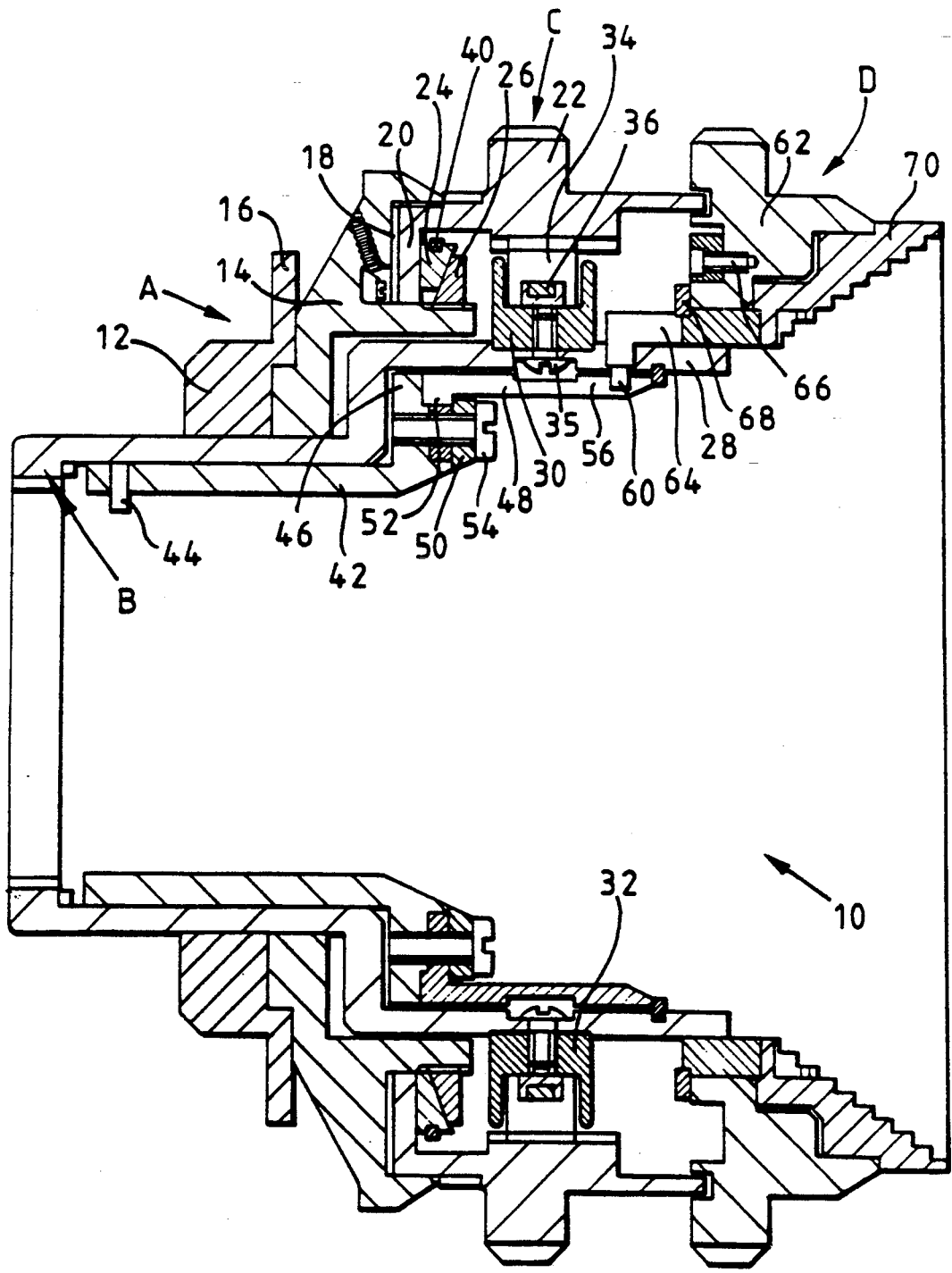

CONVERSION ARRANGEMENT FOR OPTICAL UNITS FOR USE WITH CAMERAS

BACKGROUND OF THE INVENTION

Field of the Invention

The present invention relates to a conversion arrangement for mounting optical units on cameras, particularly though not exclusively on film or television cameras.

When using optical units on modern cameras it is desirable to retain the desired focusing and iris functions of the optical units.

SUMMARY OF THE INVENTION

The present invention seeks to provide a conversion arrangement for mounting optical units on cameras.

Accordingly, the present invention provides a conversion arrangement for coupling an optical unit to a camera body, the conversion arrangement comprising:

a mounting means for attachment to the camera body;

a generally cylindrical carrier for attachment to said optical unit, said carrier being coaxially coupled to said mounting means for axial movement relative thereto:

a focusing ring coaxial with and coupled to said mounting means and said carrier for rotation relative thereto wherein rotation of said focusing ring causes said carrier to move axially of said mounting means for focusing said optical unit; and means biassed into radial engagement with said focusing ring for inhibiting axial movement of said focusing ring relative to said carrier in the absence of rotational movement of said focusing ring relative to said carrier, said inhibiting means being operable to control axial movement of said carrier during rotation of said focusing ring.

Preferably the inhibiting means comprises guide means engaged in a screw-threaded manner with said focusing ring and secured against axial and rotational movement relative to said carrier so as to guide said carrier axially of said focusing ring on rotation of said ring; and wherein said guide means is biased radially of said carrier into positive screw-threaded engagement with said focusing ring to inhibit axial movement of said focusing ring relative to said carrier in the absence of rotational movement of said focusing ring relative to said carrier.

BRIEF DESCRIPTION OF THE DRAWING

The present invention is further described hereinafter by way of example, with reference to the accompanying drawing which is a longitudinal section through a conversion arrangement according to one embodiment of the present invention with parts omitted for clarity.

DESCRIPTION OF THE PREFERRED EMBODIMENT

Referring now to the drawing, this shows a section through a conversion arrangement 10 which is intended for use with a 32 mm Cooke Speed Pancro optical unit, although it will be appreciated by those skilled in the art that the invention is applicable to other forms of optical units. The conversion arrangement enables the optical unit to be mounted on to a camera such as a film or television camera (having in this example a PL format). The conversion arrangement is fitted within the camera body, which is to the left as seen in the drawing, whilst the optical unit is contained within the conversion arrangement, facing to the right.

The conversion arrangement 10 comprises a mounting means or member A, a carrier or optical unit support B, a focusing gear C, and an iris drive gear D.

The mounting member A is dimensioned so as to fit on the front of a camera body and has a mounting adaptor 12 of suitable form and a mounting body 14. The adaptor 12 engages with the mounting arrangement on the camera to secure the conversion arrangement 10 in position. The mounting body also has an annular recess 18 which opens axially away from the camera body to receive a radially inwardly extending flange 20 of a focusing ring 22. The flange 20 is formed at the camera body end of the focusing ring 22 and is retained in the recess 18 by the action of a thrust ring 24 and retaining ring 26, this being described further below.

The optical unit support B is co-axially mounted within the mounting member A so as to be axially slidable relative thereto but is prevented from rotating relative to the mounting member A.

An annular extension 28 of the optical unit support B is provided with a radially outer annular groove in which two tenons 30, 32 are located. These support a movement ring 34 which is provided on its radially outer surface with a four start, 14 TPI Whitworth thread. This engages with a co-operating thread formed on a radially inner surface of the focusing ring 22. The tenon 30 is secured to the movement ring 34 by means of a screw (not shown) which passes laterally through the tenon and movement ring. The tenon is in turn secured to the annular extension 28 by a further screw 35, this preventing any rotation of the movement ring 34 when the focusing ring 22 is rotated. The movement ring is gapped and, when in engagement with the focusing ring 22 is under compression such that it resiles into positive engagement with the focusing ring 22. The movement ring 34 is positioned so that its gap coincides with the position of the tenon 32. The latter is not secured to the movement ring 34 but serves to support it.

A circlip 36 may be provided under compression in an annular groove in a radially inner surface of the movement ring to assist in urging the ring into positive engagement with the focusing ring 22. The gap in the circlip also coincides with the gap in the movement ring 34 to maximize its effect on the ring.

As will be appreciated, because the optical unit support B is prevented from rotating relative to the mounting body 14, rotation of the focusing ring 22 screws the movement ring 36 axially of the focusing ring 22, causing the optical unit support B to move axially of the camera body which is secured to the adaptor 12 and mounting body 14. The very positive engagement of the movement ring 34 with the focusing ring 22 avoids any backlash in the relative movement of the focusing ring and the optical unit support B and therefore in focusing of the optical unit.

Although the movement ring 34 is illustrated as engaging in arcuate grooves in the tenons 30, 32 the latter could equally engage in grooves or recesses in the movement ring.

The radially inner flange 20 of the focusing ring 22 is maintained in engagement with the mounting body 14 by the thrust ring 24 and retaining ring 26. The thrust ring is provided with a gap and has its surface facing the retaining ring 26 machined at a preselected angle with the abutting surface of the retaining ring 26 machined at the same angle. This angle lies in the range substantially 55 degrees to 80 degrees and preferably 70 degrees to the axis of the focusing ring.

The thrust ring 24 is retained between the radial flange 20 of the focusing ring 22 and the retaining ring 26, the latter being screwed onto a cylindrical extension of the mounting body 14 which forms a wall of the recess 18. Rotation of the focusing ring 22 and therefore the flange 20 causes: the thrust ring to expand very slightly, the abutting surfaces of the thrust ring 24 and retaining ring 26 sliding relative to one another. This slight expansion of the thrust ring 24 allows smooth rotation of the focusing ring 22 without introducing any axial play in the focusing ring 22 relative to the mounting body 14. However, once rotation ceases, the thrust ring 24 resiles into its rest position, thus providing a very positive location of the flange 20 and therefore of the optical unit support B whilst avoiding introducing any backlash between the focusing ring 22 and the mounting body 14 and therefore in focusing of the optical unit. To assist smooth rotation of the focusing ring 22, PTFE washers may be inserted between the flange 20 and thrust ring 24 and between the flange 20 and the mounting body 14.

The position of the retaining ring 26 can also be adjusted to provide the desired torque of focusing movement, i.e. light or heavy or somewhere in between.

It will also be appreciated that the design and operation of the thrust ring 24 automatically provides compensation for any wear which might take place in the thrust ring itself.

Although the thrust ring 24 is preferably of resilient material, a circlip 40 may conveniently be provided in an annular groove in a radially outer surface of the thrust ring 24 in order to assist in biasing the latter into firm engagement with the flange 20 and retaining ring 26.

The radially inner surface of the flange 20 of the focusing ring 22 is machined to a close tolerance to bear against the surface of the mounting body 14 and prevent any radial play in the ring 22.

In an alternative embodiment, the thrust ring 24 is replaced by a plurality of arcuate segments which are held in a generally circular arrangement by the circlip 40. Each wedge may be provided with a groove in its surface abutting the retaining ring 26 which engages with a corresponding peg or projection on the retaining ring 26 to allow radial movement of each arcuate segment but to prevent any angular movement about the axis of the mechanism.

The focusing ring 22 is provided with gear teeth on a radially outer surface to enable the ring to be rotated by the camera focusing drive.

The iris drive gear D is independent of the focusing gear C. In practice, the iris actuating mechanism is generally located towards the rear of an optical unit. Therefore, since the iris drive is positioned well into the body of the camera whilst the iris drive gear D is placed towards the front of the conversion arrangement 10, a remote connection is required between the two. In addition, because the optical unit in this example is screwed into the optical unit support and can therefore be orientated in any position when tightened, some method of radial adjustment is also necessary.

In the drawing, the iris drive gear D has an iris ring 42 and drive pin 44 connecting the iris drive gear to the iris actuating mechanism of the optical unit. The iris ring 42 is coaxially mounted within the optical unit support B and at its axial end remote from the camera body is formed with a radially outwardly extending flange 46. A generally cylindrical iris carriage 48 is clamped to the flange 46 by means of a generally cylindrical clamp plate 50. This clamps a radially inwardly directed flange 52 of the iris carriage 48 against a shoulder on the flange 46 of the iris ring 42. The clamp plate 50 is retained in position by several screws 54 equiangularly spaced around the axis of the iris carriage 48.

The iris carriage 48 has an axial groove 56 formed in its radially outer surface into which an iris pin 60 locates. The pin 60 is secured to iris gear 62 by means of a bracket 64, the bracket being secured to the iris gear 62 by screws 66. Port holes arranged in the mounting body 14 and optical unit support B allow access for the bracket 64 to operate the iris carriage 48 and thus the iris in the optical unit, over the full working range of the optical unit.

The iris gear 62 is provided on a radially outer surface with gear teeth to enable the gear to be rotatably driven by the camera iris drive. The gear 62 rotates on a closely machined diameter on the mounting body 14, axial displacement of the iris gear being controlled by a circlip 68 at the rear and a front reice ring 70 at the front.

Rotary movement of the iris gear 62 can therefore be transmitted to the iris of the optical unit via the bracket 64 and iris carriage 48 without it being affected by any movement of the focusing ring 22 or movement of the optical unit support B.

What I claim is:

1. A conversion arrangement for coupling an optical unit to a camera body, the conversion arrangement comprising:
    a mounting means for attachment to the camera body;
    a generally cylindrical carrier for attachment to said optical unit, said carrier being coaxially coupled to said mounting means for axial movement relative thereto:
    a focusing ring coaxial with and coupled to said mounting means and said carrier for rotation relative thereto wherein rotation of said focusing ring causes said carrier to move axially of said mounting means for focusing said optical unit; and
    means biased into radial engagement with said focusing ring for inhibiting axial movement of said focusing ring relative to said carrier in the absence of rotational movement of said focusing ring relative to said carrier, said inhibiting means being operable to control axial movement of said carrier during rotation of said focusing ring.

2. A conversion arrangement as claimed in claim 1 wherein said inhibiting means comprises guide means engaged in a screw-threaded manner with said focusing ring and secured against axial and rotational movement relative to said carrier so as to guide said carrier axially of said focusing ring on rotation of said ring; and wherein said guide means is biased radially of said carrier into positive screw-threaded engagement with said focusing ring to inhibit axial movement of said focusing ring relative to said carrier in the absence of rotational movement of said focusing ring relative to said carrier.

3. A conversion arrangement as claimed in claim 2 wherein said guide means is a gapped, annular member displaced from its at rest position such that it relies into positive screw-threaded engagement with said focusing ring.

4. A conversion arrangement as claimed in claim 2 or 3 wherein said guide means has biasing means urging said guide means into positive screw-threaded engagement with said focusing ring.

5. A conversion arrangement as claimed in claim 4 wherein said biasing means is a circlip means coaxial with said guide means.

6. A conversion arrangement as claimed in claim 2 wherein said guide means has a screw-thread formed on a radially outer surface thereof engaged with a screw-thread on a cooperating radially inner surface of said focusing ring.

7. A conversion arrangement as claimed in claim 1 further comprising second inhibiting means for inhibiting axial movement of said focusing ring relative to said mounting means.

8. A conversion arrangement as claimed in claim 7 wherein said inhibiting means comprises second biasing means for biasing said focusing ring towards said mounting means and means for adjusting the force of said bias.

9. A conversion arrangement as claimed in claim 8 wherein said adjusting means comprises retaining means for axially retaining said second biasing means between said retaining means and a portion of said focusing ring.

10. A conversion arrangement as claimed in claim 9 wherein said portion of said focusing ring is a radially directed flange.

11. A conversion arrangement as claimed in claim 8 wherein said second biasing means is displaceable between a first position wherein said second biasing means firmly retains said focusing ring against axial movement relative to said mounting means and a second position wherein said bias force is reduced to facilitate rotation of said focusing ring whilst retaining said ring against said axial movement; said second biasing means being displaceable from said first position to said second position in response to rotation of said focusing ring and from said second position to said first position in response to cessation of rotation of said focusing ring.

12. A conversion arrangement as claimed in claim 11 wherein said second biasing means and said retaining means have abutting, wedge-shaped surfaces inclined at a preselected angle to the rotational axis of said focusing ring such that movement of said retaining means towards said focusing ring urges said second biasing means radially of said axis against a return force.

13. A conversion arrangement as claimed in claim 12 wherein said preselected angle is in the range of substantially 55° to 80°.

14. A conversion arrangement as claimed in claim 13 wherein said preselected angle is substantially 70 degrees to said axis.

15. A conversion arrangement as claimed in claim 12 wherein said second biasing means is a gapped ring of a material dimensioned such that said ring resiles radially of said axis away from said first and second positions towards a rest position.

16. A conversion arrangement as claimed in claim 12 further comprising circlip means coaxial with said second biasing means for urging said second biasing means radially of the axis of said focusing ring towards said first position.

17. A conversion arrangement as claimed in claim 12 wherein said second biasing means comprises a plurality of arcuate members and circlip means coaxial with said arcuate members for urging said members radially of the axis of said focusing ring towards said first position.

18. A conversion arrangement as claimed in claim 11 wherein said first position is radially inwardly of said second position.

19. A conversion arrangement as claimed in claim 1 further comprising an iris drive gear coaxial with said mounting means so as to be rotatable relative thereto for preselecting a desired aperture of an iris of said optical unit, said iris drive gear being connectible to an iris actuating mechanism in said optical unit and an iris drive in said camera body to enable actuation of said iris actuating mechanism by said iris drive.

20. A conversion arrangement as claimed in claim 19 wherein said iris drive gear is connectible to said iris actuating mechanism by way of an iris carriage means coaxially mounted within said carrier for movement axially thereof independently of said carrier; wherein said iris carriage means has a first portion connectible to said iris drive gear and a second portion connectible to said iris actuating mechanism, and means for adjusting the relative angular positions of said first and second portions.

21. A conversion arrangement as claimed in claim 20 wherein said first portion of said iris carriage means comprises an iris ring and said second portion comprises an iris carriage coaxial with said iris ring, said iris carriage and said iris ring being rotatable relative to one another, and wherein said iris carriage means has clamping means for securing said iris carriage and said iris ring in a preselected relative angular position.

* * * * *